Patented Sept. 16, 1952

2,610,957

UNITED STATES PATENT OFFICE 2,610,957

INTERBONDED FIBROUS GLASS

Robert Steinman and Harry C. Courtright, Newark, Ohio, assignors to Owens-Corning Fiberglas Corporation, Toledo, Ohio, a corporation of Delaware No Drawing. Application January 9, 1947, Serial No. 721,150

11 Claims. (Cl. 260—38)

This invention relates to the bonding of fibers and more particularly of inorganic fibers such as glass fibers, in the fabrication of articles having high temperature and flame resistance.

The invention is applicable generally to the fabrication of shaped bodies of inorganic fibers, as, for example, in the bonding of a fabricated body of glass fibers in their predetermined arrangement in the construction of high temperature, flame resistant brick or insulation block; or in the coating of a prefabricated body of glass fibers for purposes of imparting mass integrity to the fibers sufficient to resist the forces incident to normal use and handling as well as pigmentation or overpainting, as in a high temperature moisture resistant pipe insulation; or in the interbonding of superposed layers of glass fibers with or without a subsequent resinous impregnation to produce a laminated board having heat and electrical resistance as well as sound deadening characteristics; or in the formation of molded plastics principally of fibrous materials. Since the fibers in themselves do not have the necessary attributes to maintain their assembled relation in resistance to incidental forces, it is expedient to incorporate other materials which operate as binders to form a composite mass. As is desirable in the consideration of glass fibers, not infrequently the added binders effectively reduce the "fly" or the disintegration of the fibers into fine particles.

Many bonding agents have been proposed for use with glass or other inorganic fibers but few have been found sufficiently satisfactory for the production of a low cost flame and heat resistant article. The bonding agents most widely used are selected from the groups of organic resinous materials which are commonly known rapidly to decompose at temperatures in excess of 400° F. The more heat resistant inorganic binders have been used, such, for example, as Portland cement or the alkali metal silicates. But, as in the case of Portland cement, there is produced a deleterious effect on the fine glass fibers, as well as, noticeable "break down" of the binder in the temperature range of 1200° F. More noticeably, the alkali metal silicates, partially dissolve or combine with the glass fibers themselves noticeably to affect the fiber strength. Furthermore, the alkali metal salts remain water soluble, thereby to restrict their field of application.

We have produced a new and improved binder which, in some instances, might even be used as a coating composition comprised principally of inorganic materials which have no deleterious affect on the reinforcing fibers such as glass, asbestos, and the like, and, at extremely high temperatures, so protects the fibers, such as glass fibers, as to enable resistance to temperatures capable even of deforming or melting the glass fibers themselves. For this purpose, we provide first an inorganic water soluble or water dispersible substance which either alone or in combination with other inter-reacting substances, is converted to the insoluble phase while interspersed with the fibers. In this manner, the fibers are bound together with strengths sufficient to resist the stresses incident to normal handling and use. This relation continues even under exposure to temperatures in excess of 1000° F., the action of direct flame, or immersion in water without the loss of strength, color, protective or bonding characteristics or the emission of volatiles.

In some instances even a large proportion of resinous materials may be incorporated with the soluble inorganic substances which, responsive to elevated temperatures, is converted with the inorganic substances to a low cost binder having improved heat, moisture, and electrical resistance, as well as desirable bonding characteristics. This invention contemplates the use of the new and improved binder in the production of moldings and plastics reinforced or filled with the inorganic fibers and materials, especially in view of the low cost, abundance and availability of the necessary binder ingredients.

As a principal constituent in the binder, we provide an inorganic salt which in its insoluble form is capable of solution in strong mineral acids. Salts illustrative of such chemical transformation or activity comprise the group of acid salts commonly known in their various forms as the primary, secondary, tertiary and the like acid salts, of which the primary salts are usually more soluble than the secondary salts, while the tertiary salts are substantially the least soluble. There is reason to believe that the excess of the mineral acid with the least soluble tertiary salts converts the salt back to its more soluble primary phase to render the composition soluble in water. It remains that when the excess acids are removed or taken up by reaction, the insoluble acid salt is set free. Thus is it possible to apply the inorganic salt in the presence of an excess of inorganic acids and other additives, hereinafter described, as a water solution, emulsion or dispersion adapted readily to be thinned with additional fluids to enhance interspersement with the fibers, and while in combination with the fibers converted, for example, at elevated temperatures to an insoluble and substantially infusible phase.

Preferred acid salts comprise such metals as aluminum, iron, and zinc, with acid radical of phosphoric acid PO₄. There is sound basis for the belief that the other polyvalent metals such, for example, as nickel, cobalt, copper, bismuth, magnesium, barium, strontium, calcium, cadmium, mercury, lead, tin, cerium, and chromium are equally as capable of forming the salt combinations to comprise the binder with phosphoric acid, or even other additional acids as are to be found in the category of dibasic, tribasic, tetrabasic acids and the like polybasic acids capable of forming acid salts with the metals, such for example as sulphuric acid, boric acid, chromic acid, arsenic acids and the like.

Obviously many inorganic salts may be considered as useful for the bonding of the various fibrous materials. However, for purposes of description, the combination of glass fibers with the salts of aluminum phosphate may be taken as illustrative. An insoluble salt of aluminum phosphate results when the theoretical proportions of the elements are combined, as, for example, when one molecular weight of aluminum combines with one molecular weight of PO₄ to form the insoluble tertiary salt AlPO₄, whereas, when an excess of phosphoric acid is present, the acid salts first formed are found to be more soluble proportionately to the decreasing ratio of aluminum to PO₄. Thus, when less than 1.5 molecular weights of aluminum are combined with 3 molecular weights of phosphoric acid, a salt is first formed which is soluble in water, but on standing or exposure to elevated temperatures in the range of 250 to 700° F., molecular readjustment occurs toward the formation of salts of the insoluble phase, particularly if other basic ingredients are present to react therewith in a manner to exhaust some of the excess phosphoric acid or to combine with the acid salts in a manner to form a complex insoluble substance.

Possible reactions of aluminum ion with phosphoric acid are illustrated as follows:

| Reaction | Ratio of molecular weight of aluminum to phosphoric acid |
|---|---|
| 1. $Al^{+++} + 3H_3PO_4 \longrightarrow Al(H_2PO_4)_3 + 3H^+$ <br> Primary salt of aluminum dihydrogen phosphate | 1 to 3 |
| 2. $2Al^{+++} + 3H_3PO_4 \longrightarrow Al_2(HPO_4)_3 + 6H^+$ <br> Secondary salt of aluminum hydrogen phosphate | 2 to 3 |
| 3. $Al^{+++} + H_3PO_4 \longrightarrow AlPO_4 + 3H^+$ <br> Tertiary salt of aluminum phosphate | 3 to 3 |
| 4. $Al(H_2PO_4)_3 \xrightarrow{-H_3PO_4} Al_2(HPO_4)_3 \xrightarrow{-H_3PO_4} AlPO_4$ | |

In practice, we have found that more satisfactory adhesive combinations are obtained when the ratio of aluminum to phosphoric acid is maintained in the range of 0.6 to 1.45 molecular weights of aluminum to 3 of phosphoric acid to combine in accordance with reaction Number 1 forming, in the main, the water soluble primary salt. If greater proportions of aluminum to phosphoric acid are used, not only are more viscous mixtures produced thereby to impair fiber impregnation, but a substantially greater portion of the other less soluble salts are formed, which salts are less suitable for the purposes desired. The secondary and tertiary salts are considered to be less reactive with the additives hereinafter described. The basic additives react with the hydrogen ions in the aluminum dihydrogen phosphate or the hydrogen ions freed therefrom at elevated temperatures to produce what is believed to be a new composition of matter of complex salts or a mixture of salts, the exact structure and composition of which are presently unidentified. Suffice it to say that excellent heat and flame resistant binder characteristics are found to exist.

While several methods are available for the preparation of the acidulous solutions of the acid salts, one satisfactory method comprises the admixture of the metal, preferably as the metal oxide or hydroxide with the desired acid. The metal may be used as the technically pure compound, or in more readily available forms such as an ore comprised principally of the desired metal, as the oxide or hydroxide, such for example as bauxite $Al_2O_3 \cdot 3H_2O$. The predetermined amount of acids may be incorporated in various dilutions. Not infrequently, it is expedient to warm the mixture for purposes of accelerating the initial reaction, but preferably not at such temperatures as will accelerate the transformation of the reaction towards the formation of the less soluble salts.

Examples follow of acidulous solutions of acid salts suitable alone as a binder, or, as the principal ingredient, hereinafter referred to as the parent solution, for use in combination with other additives.

EXAMPLE 1

100 parts phosphoric acid (80% concentration)
25 parts hydrate of alumina $Al_2O_3 - 3H_2O$
20 parts "Aerosol" wetting agent (20% concentration)
20–200 parts water The phosphoric acid and hydrate of alumina are mixed together at room temperature until substantial solution occurs. The wetting agent used to enhance fiber impregnation is then added with sufficient water to thin the mixture to the viscosity and solids content desired. Application or impregnation of the fibers may be any of the well-known methods, such for example as by dipping, flow coating, painting, spraying or impregnation by the vacuum and pressure technique. On exposure of the fibers interspersed with the binder solution to temperatures in the range of 400 to 700° F. for times as low as a few minutes at the latter temperature, the volatiles are driven off and the inorganic substances are converted to their insoluble phase, binding the fibers together.

EXAMPLE 2

100 parts phosphoric acid (80% concentration
24 parts ferric oxide
20 parts wetting agent (20% concentration)
20–200 parts water Preparation and application is similar to that described in connection with Example 1.

EXAMPLE 3

100 parts phosphoric acid
60 parts Mayari ore (iron oxide)
20–200 parts water

Although the ore contains other elements, preparation and application is made similar to that previously described in connection with Example 1.

Conversion of the soluble acid salts to the insoluble phase is greatly enhanced if other basic substances are incorporated into the acidulous solution to react either with the freed hydrogen ions or else to react with the hydrogen ions of the acid salt to form a complex salt or mixture of salts in the insoluble phase preferably while on the fiber surfaces. The commonly known oxides and hydroxides of the alkali metals are not as satisfactory as the added basic substance as are the oxides and hydroxides of the polyvalent metals, such, for example, as the alkaline earth metal oxides and hydroxides including barium hydroxide, calcium oxide and the like. Obviously, the less soluble basic substances are not as immediately reactable with the acidic substances, and, therefore, do not urge the equilibrium of the reaction toward the formation of their less soluble forms before it is desired.

New and greatly improved binders are produced if basic substances are used in combination with the solubilized acid salts, which basic substances are totally insoluble in the parent acidulous solution, but when the composition is elevated to high temperatures the basic substances are rendered reactive then to combine with the free hydrogen ions or the reactive acid salts to form complex inorganic salts. The complex salts form binders having greatly increased resistance to hydroscopicity in comparison to that of the acid salts themselves. They also impart improved protective qualities and heat resistance to the glass fibers or other fibrous materials. The basic substances are adapted to be incorporated in an amount capable wholly or partially to react with the acid substances or freed hydrogen ions to produce a more stable binder. Suitable basic substances are to be found among the basic silicates and especially the basic silicates containing aluminum, iron or the like including, for example the various clays such as bentonite, kaolin, china clays, potters clays and the like; basic silicates such as dicalite, cellite, infusorial earths, diatomaceous earths; less basic silicates which also operate as hardeners and the like, such as talcs, soapstone, flint, silica, pyrophyllite, asbestos tailings, and mica dust.

In addition, fillers may be incorporated for purposes of modifying the binder characteristics such, for example, as pigments for purposes of tinting the composite mass, and the more inert fillers of the type described above. Small amounts of water soluble resinous materials preferably of the heat reactive type, might also be incorporated with the parent solution for the purpose of imparting some degree of adhesiveness in the preliminary stages, and, until they are completely decomposed at excessive temperatures, some degree of flexibility, toughness and cohesion which influences the reduction of the "fly" and "brashiness" of the product. Suitable water soluble materials comprise the heat reactive phenol aldehyde, urea aldehyde, melamine aldehyde and furfural resins partially reacted to their water soluble phase, as well as some of the water soluble thermoplastic materials including the polyvinyl alcohols, methyl and carboxymethyl cellulose, polyesters, glue, proteins, starch, gums and carbohydrates. Limitations only reside in the fact that compatibility with the acid salt solution is desirable.

Incorporation of the additives as finely divided materials may be made as a suspension or dispersion in the parent solution as effected by a colloid mill or the like. The additives preferably are of the type which are at first insoluble and non-reactive with the acid salts until they are exposed to elevated temperatures while on the fiber surfaces, to form with the acidic salts a complex substance in the insoluble phase. Fiber impregnation often is aided by the addition of more water to lower the viscosity and the incorporation of a wetting agent.

Various examples of suitable binder compositions are illustrated as follows:

EXAMPLE 4

*Parent solution*

100 parts phosphoric acid (85% concentration)
20 parts hydrate of alumina
50 parts water

*Binder*

100 parts of the parent solution
40 parts barium hydroxide
30 parts dicalite
10 parts heat reactive phenolic resin
5 parts "Aerosol" 20% solids
50–200 parts water

EXAMPLE 5

100 parts of the parent solution of Example 1
50 parts bentonite
2 parts quadrafos
2 parts "Aerosol" wetting agent
20–300 parts water

EXAMPLE 6

100 parts of the parent solution of Example 1
60 parts diatomaceous earth
20 parts kaolin clay
5 parts asbestos tailings
2 parts wetting agent
20–500 parts water Ordinarily it is desirable first to prepare the parent solution as previously described, and then incorporate the additives as by intimate mixing to form a suspension or dispersion of the insoluble additives in the aqueous solution. Substantially complete impregnation of the fibrous mass of glass wool or the like either in board, sheet or prefabricated form, as for pipe insulation, may readily be effected either by pouring the dispersion over the fibrous mass, or inundating the mass in a bath of the binder. In more difficult applications or where the viscosity of the binder impairs the free flow, successive vacuum and pressure means may be used to force the aqueous suspension into the interstices between the fibers. After impregnation, the excess binder is permitted to drain from the treated mass which is then subjected to elevated temperatures in the range of 250 to 700° F. During the heating cycle, the volatile matter is vaporized off and the acid salts are converted in combination with the additives to insoluble complex substances having sufficient binder characteristics to hold the fibers in their predetermined position even at temperatures in excess of 1800° F. which is above the fiber softening temperature. At such elevated temperature, the binder is such as to combine with glass fibers to form a new and more heat resistant glassy phase having properties differing from either the original binder or glass.

When it is desired to laminate two or more impregnated boards, reaction may be made in such suitable molds at elevated temperatures. Not infrequently, when the boards are to be used as panels wherein the temperature is not to exceed 400° F., subsequent resinous impregnation to fill up the ever present pin holes of the cured board is advantageously effected.

Of the same general character, there may be prepared an adhesive on incorporation with the parent solution containing the soluble primary salt of an acid salt, a large portion of water soluble resin which is readily convertible by pyrolysis in the presence of the aqueous acidulous solution and in combination therewith to an insoluble binder. Organic substances of the type most suitable for incorporation comprise those hydroxylated carbon compounds which, on heating to a point below their ignition temperature, is converted pyrolytically to carbon or carbonaceous decomposition products having excellent adhesive characteristics. In this reaction, acidic substances, such as those of the acid salts of the parent solution, catalyze the breakdown so as to form the binder product during relatively short heating cycles, and the acid salts in their insoluble phase further impart heat resistance, thereby to form a binder having a degree of heat resistance in excess of the ordinary organic binders. Suitable organic compositions include the carbohydrates and, specifically, use may be made of the low cost residue of carbohydrate refining operations, such as the product "hydrol," which is the residue of sugar refining, as well as, corn syrup or the like. An example of a suitable binder comprising an acid salt and a carbohydrate is as follows:

EXAMPLE 7

100 parts of the parent solution of Example 4
400 parts of "hydrol" of 50% solids After impregnation of the fibrous mass, the baking cycle is limited only by the ignition temperature of the organic material, which ordinarily is found to include temperatures in excess of 600° F. During baking, the acid salts are converted to their insoluble phase and the organic materials are pyrolytically converted to a form of insoluble carbonaceous binder.

It is apparent from the description that we have produced new and improved heat resistant binders formed principally of inorganic materials for bonding fibers, and preferably the inorganic fibers, in their assembled relation. It is to be understood that pigmentation of the binders to produce the desired coloring effect may be affected by incorporation of the pigments as fillers, or, else, the cured mass may be overcoated with pigmented fluids such as heat resistant paints.

It is apparent that the binder may be used in combination with prefabricated masses of glass fibers to produce blocks, bricks, pipe and stove insulation and the like, or it may be used as a coating for pipe insulation, laminated board or the like, or in addition, the fibers in the more finely divided form may be incorporated with the binder to produce a plastic mass formable to the desired shape for molding purposes as a plastic.

It is to be further understood that numerous changes and substitutions may be made of the materials and their method of preparation and application without departing from the spirit of the invention especially as defined in the appended claims.

We claim:

1. A fabricated body of glass fibers bonded with the reaction product at elevated temperatures of an acid salt formed of aluminum and an excess of phosphoric acid with an inorganic basic substance characterized by inactivity at room temperature but reactive with the acid salt on the glass fiber surfaces at elevated temperatures to form a new reaction product, and organic resinous materials impregnating the bonded body of glass fibers.

2. The process which comprises distributing with glass fibers an acidulous aqueous slurry of aluminum phosphate in which three molecular equivalents of the phosphate radical are present per 0.6 to 1.45 molecular equivalents of aluminum, finely divided basic inorganic substances selected from the group consisting of polyvalent metal oxides, polyvalent metal hydroxides and basic silicates and basic silicates containing aluminum, and a small amount of heat convertible water soluble organic material soluble in the acidulous aqueous medium of the slurry, forming the mass to the desired shape, and baking the mass at an elevated temperature in the range of 250° to 700° F. to form a heat stable, non-inflammable bonded mass of glass fibers.

3. A glass fiber structure bonded with the thermal reaction product of an acid salt formed of three molecular equivalents of a phosphate radical to 0.6 to 1.45 molecular equivalents of aluminum reacted in situ on the glass fiber surfaces at a temperature in the range of 250–700° F. to convert the acid salt from a soluble phase to an insoluble binder phase.

4. A glass fiber structure bonded with the thermal reaction product of an acid salt formed of three molecular equivalents of a phosphate radical to 0.6 to 1.45 molecular equivalents of aluminum and basic inorganic substances latent at room temperature but reactive with the acid salt at a temperature between 250–700° F. to convert the acid salt from a soluble phase to an insoluble complex reaction product which binds the fibers.

5. A glass fiber structure coated with the thermal reaction product of an acid salt formed of 3 molecular equivalents of a phosphate radical with 0.6 to 1.45 molecular equivalents of aluminum, an inorganic filler and basic inorganic substances latent at room temperature but reactive with the acid salt at a temperature between 250 and 700° F. to convert the acid salt in combination with the filler and glass fibers from a soluble phase to an insoluble complex reaction product which binds the fibers.

6. A glass fiber structure bonded with the thermal reaction product of an acid salt formed of 3 molecular equivalents of a phosphate radical and 0.6 to 1.45 molecular equivalents of aluminum and basic inorganic substances latent at room temperature but reactive with the acid salt at a temperature between 250 and 700° F. to convert the acid salt in combination with the glass fibers from a soluble phase to an insoluble complex reaction product which binds the fibers, and an organic resinous material operative temporarily to bind the fibers until the inorganic reaction product is formed.

7. A glass fiber structure bonded with the thermal reaction product of an acid salt formed of 3 molecular equivalents of a phosphate radical and 0.6 to 1.45 molecular equivalents of aluminum reacted in situ on the glass fiber surfaces at a temperature in the range of 250–700° F. to convert the acid salt in combination with the glass fibers from a soluble phase to an insoluble binder phase, and an organic resinous material impregnating the bonded glass fiber mass.

8. The method of bonding glass fibers into a composite substantially inorganic structure having high heat resistance comprising the steps of combining the glass fibers with an acidulous aqueous mixture containing an acid salt formed of three molecular equivalents of phosphate radical and 0.6 to 1.45 molecular equivalents of aluminum the acid salt being in the soluble phase and convertible to an insoluble phase at elevated temperatures, and heating the combination at a temperature of 250–700° F. for converting the acid salt to an insoluble binder phase.

9. The method of bonding glass fibers into a composite substantially inorganic structure having high heat resistance comprising the steps of combining the glass fibers with an acidulous aqueous mixture containing an acid salt formed of three molecular equivalents of a phosphate radical to 0.6 to 1.45 molecular equivalents of aluminum and basic inorganic materials insoluble in the acidulous aqueous mixture at room conditions but reactive at elevated temperatures to convert the acid salt from the soluble phase to an insoluble reaction product in situ on the glass fiber surfaces, heating the combined materials at a temperature of 250–700° F. to effect the desired conversion of the materials to the insoluble reaction product on the glass fiber surfaces.

10. The method of bonding glass fibers into a composite substantially inorganic structure having high heat resistance comprising the steps of combining the glass fibers with an acidulous aqueous mixture containing an acid salt in its soluble stage formed of three molecular equivalents of a phosphate radical and 0.6 to 1.45 molecular equivalents of aluminum and convertible to less soluble stages at elevated temperatures, inorganic fillers and basic materials inactive at room temperature but reactive at elevated temperatures for conversion of the acid salt from the insoluble phase to form an insoluble complex reaction product therewith in the presence of the glass fibers and filler, heating the combined materials to a temperature of 250–700° F. to effect the desired reaction in the formation of the insoluble binder.

11. The method of bonding glass fibers into a composite substantially inorganic structure having high heat resistance comprising the steps of combining the glass fibers with an acidulous aqueous mixture containing an acid salt in its soluble stage formed of three molecular equivalents of a phosphate radical and 0.6 to 1.45 molecular equivalents of aluminum and convertible to less soluble stages at elevated temperatures, an organic resinous material soluble in the acidulous aqueous mixture to impart temporary adhesiveness, and basic materials inactive at room temperature but reactive at elevated temperatures for conversion of the acid salt from the insoluble phase to form an insoluble complex reaction product therewith in the presence of the glass fibers and resinous material, heating the combined materials to a temperature of 250–700° F. to effect the desired reaction in the formation of the insoluble binder.

ROBERT STEINMAN.
HARRY C. COURTRIGHT.

REFERENCES CITED

The following references are of record in the file of this patent:

UNITED STATES PATENTS

| Number | Name | Date |
|---|---|---|
| 1,996,032 | Roos | Mar. 26, 1935 |
| 2,237,745 | Musgrave | Apr. 8, 1941 |
| 2,322,930 | Gardner | June 29, 1943 |
| 2,366,485 | Brink | Jan. 2, 1945 |
| 2,444,347 | Greger | June 29, 1948 |
| 2,465,645 | Greger | Mar. 29, 1949 |

FOREIGN PATENTS

| Number | Country | Date |
|---|---|---|
| 439,598 | Great Britain | Dec. 10, 1935 |